United States Patent
Naismith et al.

(10) Patent No.: US 6,327,511 B1
(45) Date of Patent: Dec. 4, 2001

(54) INPUT/OUTPUT (I/O) SCANNER FOR A CONTROL SYSTEM WITH PEER DETERMINATION

(75) Inventors: Ron Naismith, N. Andover; Allan Tanzman, Newton Centre; Dean Papadopoulos, Groton, all of MA (US); Andy Swales, Windham, NH (US); Orlando P. Metcalf, North Andover, MA (US)

(73) Assignee: Schneider Automation, Inc., North Andover, MA (US)

( * ) Notice: Subject to any disclaimer, the term of this patent is extended or adjusted under 35 U.S.C. 154(b) by 0 days.

(21) Appl. No.: 09/224,196

(22) Filed: Dec. 30, 1998

(51) Int. Cl.$^7$ .................................................. G05B 11/01

(52) U.S. Cl. ........................................... 700/19; 709/217

(58) Field of Search ................. 700/1, 9, 19, 2, 700/11; 709/217, 220

(56) References Cited

U.S. PATENT DOCUMENTS

| | | | |
|---|---|---|---|
| 3,971,000 | 7/1976 | Cromwell | 700/84 |
| 4,319,338 | 3/1982 | Grudowski et al. | 710/109 |
| 4,688,167 | 8/1987 | Agarwal | 345/343 |

(List continued on next page.)

FOREIGN PATENT DOCUMENTS

| | | |
|---|---|---|
| 296 00 609 U1 | 3/1997 | (DE) . |
| 441 0 171 C1 | 4/1997 | (DE) . |
| 196 15 093 A1 | 10/1997 | (DE) . |
| 0 542 657 A1 | 5/1993 | (EP) . |
| 0 814 393 A1 | 12/1997 | (EP) . |
| WO 97/18636 | 5/1997 | (WO) . |
| WO 98/53581 | 11/1998 | (WO) . |

OTHER PUBLICATIONS

Using World–Wide Web for Control Systems,, F. Momal, C. Pinto–Pereira, AT Division CERN, 1211 Geneva 23, http://mish231.cern.ch/Docs/ICALEPCS/1995/icalep95.htm.
Website Information of PROFIBUS: Technical Overview.
Website Information of ODVA—The Open DeviceNet's Vendor Association.

(List continued on next page.)

Primary Examiner—William Grant
Assistant Examiner—Zoila Cabrera
(74) Attorney, Agent, or Firm—Michael J. Femal; Larry I. Golden

(57) ABSTRACT

The present invention is directed to an apparatus for communication with at least one device which resides on a standard communications network using a standard communications protocol. The apparatus has a scanner for scanning the device, a device scan table for storing data relating to the device, and a standard communications interface for interfacing between the device scanner and the standard communications network using the standard communication protocol. The present invention is also directed to a device scanner for a first device located on a first node of a standard communications network. The device scanner is provided for scanning devices on the standard communications network, and for identifying a second device on a second node of the standard communications network. The device scanner has an initiator for initiating a first communications command in a peer protocol format to the second node, a receptor for receiving from the second node a second communications command in the peer protocol format, in response to the first communications command, and an identifier for identifying the second device on the second node as a peer device. This apparatus and device can be used within a control system for monitoring input devices and for controlling output devices which reside on the standard communications network. The standard communications network can be an Ethernet network, and the standard communications protocol used therein can TCP using Modbus.

3 Claims, 11 Drawing Sheets

U.S. PATENT DOCUMENTS

| | | | |
|---|---|---|---|
| 4,845,644 | 7/1989 | Anthias et al. | 345/343 |
| 4,858,152 | 8/1989 | Estes | 702/186 |
| 4,897,777 | 1/1990 | Janke et al. | 700/5 |
| 4,912,623 | 3/1990 | Rantala et al. | 700/7 |
| 4,937,777 | 6/1990 | Flood et al. | 710/107 |
| 4,949,274 | 8/1990 | Hollander et al. | 324/142 |
| 4,953,074 | 8/1990 | Kametani et al. | 700/3 |
| 4,992,926 | 2/1991 | Janke et al. | 709/225 |
| 5,012,402 | 4/1991 | Akiyama | 700/87 |
| 5,023,770 | 6/1991 | Siverling | 700/11 |
| 5,047,959 | 9/1991 | Phillips et al. | 345/357 |
| 5,072,356 | 12/1991 | Watt et al. | 700/23 |
| 5,072,412 | 12/1991 | Henderson, Jr. et al. | 345/346 |
| 5,109,487 | 4/1992 | Ohgomori et al. | 709/237 |
| 5,122,948 | 6/1992 | Zapolin | 700/2 |
| 5,131,092 | 7/1992 | Sackmann et al. | 709/207 |
| 5,134,574 | 7/1992 | Beaverstock et al. | 702/84 |
| 5,151,896 | 9/1992 | Bowman et al. | 370/401 |
| 5,151,978 | 9/1992 | Bronikowski | 709/216 |
| 5,157,595 | 10/1992 | Lovrenich | 700/7 |
| 5,159,673 | 10/1992 | Sackmann et al. | 709/216 |
| 5,161,211 | 11/1992 | Taguchi et al. | 706/62 |
| 5,165,030 | 11/1992 | Barker | 703/20 |
| 5,179,700 | 1/1993 | Aihara et al. | 345/326 |
| 5,225,974 | 7/1993 | Matthews et al. | 700/11 |
| 5,245,704 | 9/1993 | Weber et al. | 709/215 |
| 5,251,302 | 10/1993 | Weigl et al. | 710/263 |
| 5,283,861 | 2/1994 | Dangler et al. | 345/339 |
| 5,297,257 | 3/1994 | Struger et al. | 700/83 |
| 5,307,463 | 4/1994 | Hyatt et al. | 710/1 |
| 5,321,829 | 6/1994 | Zifferer | 714/46 |
| 5,349,675 | 9/1994 | Fitzgerald et al. | 379/102.01 |
| 5,398,336 | 3/1995 | Tantry et al. | 707/103 |
| 5,406,473 | 4/1995 | Yoshikura et al. | 700/20 |
| 5,420,977 | 5/1995 | Sztipanovits et al. | 345/356 |
| 5,440,699 | 8/1995 | Farrand et al. | 345/329 |
| 5,446,868 | 8/1995 | Gardea et al. | 703/27 |
| 5,528,503 | 6/1996 | Moore et al. | 700/95 |
| 5,598,536 | 1/1997 | Slaughter, III et al. | 709/219 |
| 5,613,115 | 3/1997 | Gihi et al. | 717/1 |
| 5,623,652 | 4/1997 | Vora et al. | 707/10 |
| 5,625,781 | 4/1997 | Cline et al. | 345/335 |
| 5,699,350 | 12/1997 | Kraslavsky | 370/254 |
| 5,734,831 | 3/1998 | Sanders | 709/223 |
| 5,805,442 | 9/1998 | Crater et al. | 700/9 |
| 5,950,006 | 9/1999 | Crater et al. | 717/5 |
| 5,975,737 | 11/1999 | Crater et al. | 700/9 |
| 5,982,362 | 11/1999 | Crater et al. | 725/105 |
| 5,997,167 | 12/1999 | Crater et al. | 700/79 |

OTHER PUBLICATIONS

Website of PROFIBUS International—Welcome Page.

When Technology Standards Become Counterproductive, Kenneth C. Crater, President, Control Technology Corporation, Hopkinton, MA dated Jul. 9, 1999, pp. 1–5.

A White Paper State Language for Machine Control, Kenneth C. Crater, President, Control Technology Corporation, Hopkinton, MA dated Jul. 9, 1999, pp. 1–11.

New PC–based Process Control & Data Acquisition Software Integrates Remote Internet Capabilities with Fast Pentium Support, Fred A. Putnam, Labtech President, pp. 1–3.

Aug. 1996 Control Magazine—In The News—Electric Utility Industry Embarks on Automation Overhaul, pp. 1–10.

Jul. 1997 Control Magazine—Magazine Software Review—NT Package Give Plant Access Through the Web, pp. 1–3.

Oct. 1996 Control Magazine—Software Review—Article Archives, pp. 1–2.

ICS Instrumentation & Control Systems—Windows NT for real–time control: Which way to go?—ICS Magazine, pp. 1–8.

I&CS Jul. 1999—Special Report Software—Software: Open source OSs, objects, Web–based communications challenge status quo, (Wayne Labs, Senior Technical Editor), pp. 24–49.

Landis & Staefa MS 2000, pp. 1–2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1–2.

SoftPLC Corporation—Java Support in SoftPLC Corp. Products, pp. 1–5.

Mach J. Company, MachJ, an enbeddable, clean room Java Virtual Machine, p. 1.

SoftPLC Corporation—The History of Programmable Controllers, Looking Back From the Year 2000 A.D. (Or, How Computers Replaced Proprietary PLC'S), pp. 1–7.

SoftPLC Corporation—TOPDOC: Advanced PLC program development & documentation software, pp. 1–12.

Control Engineering Online Magazine Articles (Jul. 1998)—No. that's not a PC, it's a PLC, pp. 1–2.

Rockwell International Corporation, Allen–Bradley Introduces PLC–5/80E Controller for Ethernet Communications Networks.

Rockwell Automation—Search Results, pp. 1–2.

Rockwell International Corporation, Vision & Direction, The Direction of Automation Systems, pp. 1–4.

Rockwell International Corporation, Vision & Direction, The Role of Open Systems, pp. 1–4.

Rockwell International Corporation—Vision & Direction—The Direction of Automation Systems—Emergence of Application–Specific Control Solutions, pp. 1–2.

Rockwell International Corporation—Vision & Direction—The Direction of Automation Systems—The New Factory Worker, pp. 1–2.

Rockwell International Corporation, Vision & Direction, Control System Deliverables—The Next Step, pp. 1–2.

Rockwell International Corporation, Vision & Direction, Conclusion & Acknowledgments, pp. 1–2.

Rockwell International Corporation—Choices—Perspectives on the Future of Automation Control, p. 1.

Rockwell International Corporation—Allen–Bradley—Networks—Ethernet for Industrial Control—An Ethernet White Paper—Apr. 21, 1998, pp. 1–13.

Rockwell International Corporation—Automation Systems Control—General—World–Class Automation Systems from Allen–Bradley, Last Updated: May 7, 1998, pp. 1–12.

PC QUEST, Dec '97—Point, click, Control—C–Programmable controllers take the pain out of embedded control, pp. 1–2.

berthel—automation with imagination—PCI 100—Programmable logic controller for SIMATIC/IBM IPC, pp. 1–3.

Yahoo! Personalized Search Results for programmable logic controller internet access, pp. 1–3.

Siemens—SIMATIC report 1/97—New in the SIMATIC Library, pp. 1–2.

Control Magazine Aug. 1998—Field Test—Dynamic Software Makes Control Integration Easier, pp. 1–2.

Design and Reuse Web Site—EDTN Network—Analyze IP Database Content—Analyse Reuse Blocks per taxonomy tree, pp. 1–10.

Engineering Information, Inc.—Ei CPX WEB [1990–94].

"Ethernet Base Gateway Product," AEG–Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB–TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"Open MODBUS/TCP Specification," A. Swales, Sep. 3, 1997.

"[comp.unix.programmer] Unix–Socket–FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 2 Information," Bob Quinn, 1995–1998 (last updated Dec. 5, 1998).

Abstract of "Implementing distributed controls for FMC's using Internet utilities," S. S. Jagdale and N. Merchant; Computers of Industrial Engineering, vol. 31 No. 1–2, p. 87–90; Oct., 1996 (UK).

Abstract of "Process Control takes to the Net," Greg Paula, Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec., 1996..

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185–7, 1996.

Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, p. 49–51.

Abstract of "Simulation on the integration of process control systems of rolling mill plants through standard networks, "Choo Young Yeol, Hwang Hwa Won and Kim Cheeha, Proceedings of the Industrial Computing Conference, Instrument Society of America, Research Triangle Park, NC, USA. p 1–14; vol. 6, No. 1, 1996.

Abstract of "Environmental waste control digest," Clayton H. Billings; Public Works vol. 127 No. 7, 6 pp, Jun., 1996.

Abstract of "Experiments in tele–handling and tele–machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototyping and reverse engineering system for mechanical parts–on–demand on the national network," Fred Hansen, Elias Pavlakos, Eric Hoffman, Takeo Kanade, Raj Reddy, Paul Wright; Journal of Manufacturing Systems, vol. 12 No. 4, p. 269–281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99–104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 465–81, Fig. 3, Ref. 7, 1995. (Japan).

Abstract of "High–efficient application technology of DCS from the viewpoint of users," Oka Norihito (1); Narita Tsutomu (1); (1) Yamatake–Honeywell Co., Ltd.; Otomeshon, vol. 40, No. 2, p. 24–28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, p. 51–57; 1996. (USA).

Abstract of "Integrated design and process technology. vol. 2;" Tanik, M.M.; Bastani, F.B.; Gibson, D.; Fielding, P.J.; Society for Design and Process Science, p. 423–430, 1996. (USA).

Abstract of "Integrated design and process technology. vol. 2" Tanik, M.M.; Bastani, F.B.; Gibson, D.; Fielding, P.J.; Society for Design and Process Science, p. 306–312, 1996.

Abstract of "Need low–cost networking consider DeviceNet," W.H. Moss; InTech vol. 43:11; p. 30–31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25–30; Dec., 1999.

LabVIEW Graphical Programming for Instrumentation, *Networking Reference Manual,* © Copyright 1993, 1994 National Instruments Corporation, Part No. 320587B–01, Sep. 1994.

LabVIEW Graphical Programming for Instrumentation, *Tutorial for Windows,* © Copyright 1993, 1994 National Instruments Corporation, Part No. 320593B–01, Sep. 1994.

LabVIEW Graphical Programming for Instrumentation, *Data Acquisition VI Reference Manual for Windows,* © Copyright 1992, 1994 National Instruments Corporation, Part No. 320536B–01, Sep. 1994.

INPUT/OUTPUT (I/O) SCANNER FOR A CONTROL SYSTEM WITH PEER DETERMINATION

DESCRIPTION

Technical Field

The present invention generally relates to control systems. More specifically, the present invention relates to an apparatus and method for determining the type of a communication device using known communication protocols over standard networks, and for moving data, relating to input and output (I/O) devices within the control system, to and from a programable logic controller.

BACKGROUND OF THE INVENTION

Within control systems, there has a need to make I/O devices and modules, programmable logic controllers (PLCs), and other devices capable of being used on standard communications protocols, such as Ethernet, TCP/IP, and others. This includes the ability to interface a proprietary communications protocol with standard protocols. Previous I/O scanners within such devices, typically used proprietary control networking protocols. Using proprietary control networking protocols, resulted in high installation costs, low ease-of-use, and compatibility problems with other devices/systems used in control systems, such as in factory automation applications. U.S. Pat. Nos. 5,159,673 (Sackman et al.), 4,992,926 (Janke et al.), 4,897,777 (Jamke et al.), 5,245,704 (Weber et al.), 4,937,777 (Flood et al.), 5,307,463 (Hyatt et al.), and /or 5,805,442 (Crater et al.) provide some background and context for the present invention.

The present invention is directed to solving the above mentioned and other problems.

SUMMARY OF THE INVENTION

The present invention is an apparatus for communication with at least one device which resides on a standard communications network, such as an Ethernet network, using a standard communications protocol, such as TCP using Modbus. The apparatus has a scanner for scanning the device, a device scan table for storing data relating to the device, and a standard communications interface for interfacing between the device scanner and the standard communications network using the standard communication protocol.

The present invention is also a device scanner for a first device located on a first node of a standard communications network. The device scanner is provided for scanning devices on the standard communications network, and for identifying a second device on a second node of the standard communications network. The device scanner has an initiator for initiating a first communications command in a peer protocol format to the second node, a receptor for receiving from the second node a second communications command in the peer protocol format, in response to the first communications command, and an identifier for identifying the second device on the second node as a peer device. This apparatus and device can be used within a control system for monitoring input devices and for controlling output devices which reside on the standard communications network, as will be described in detail below.

DETAILED DESCRIPTION

Figure 1:
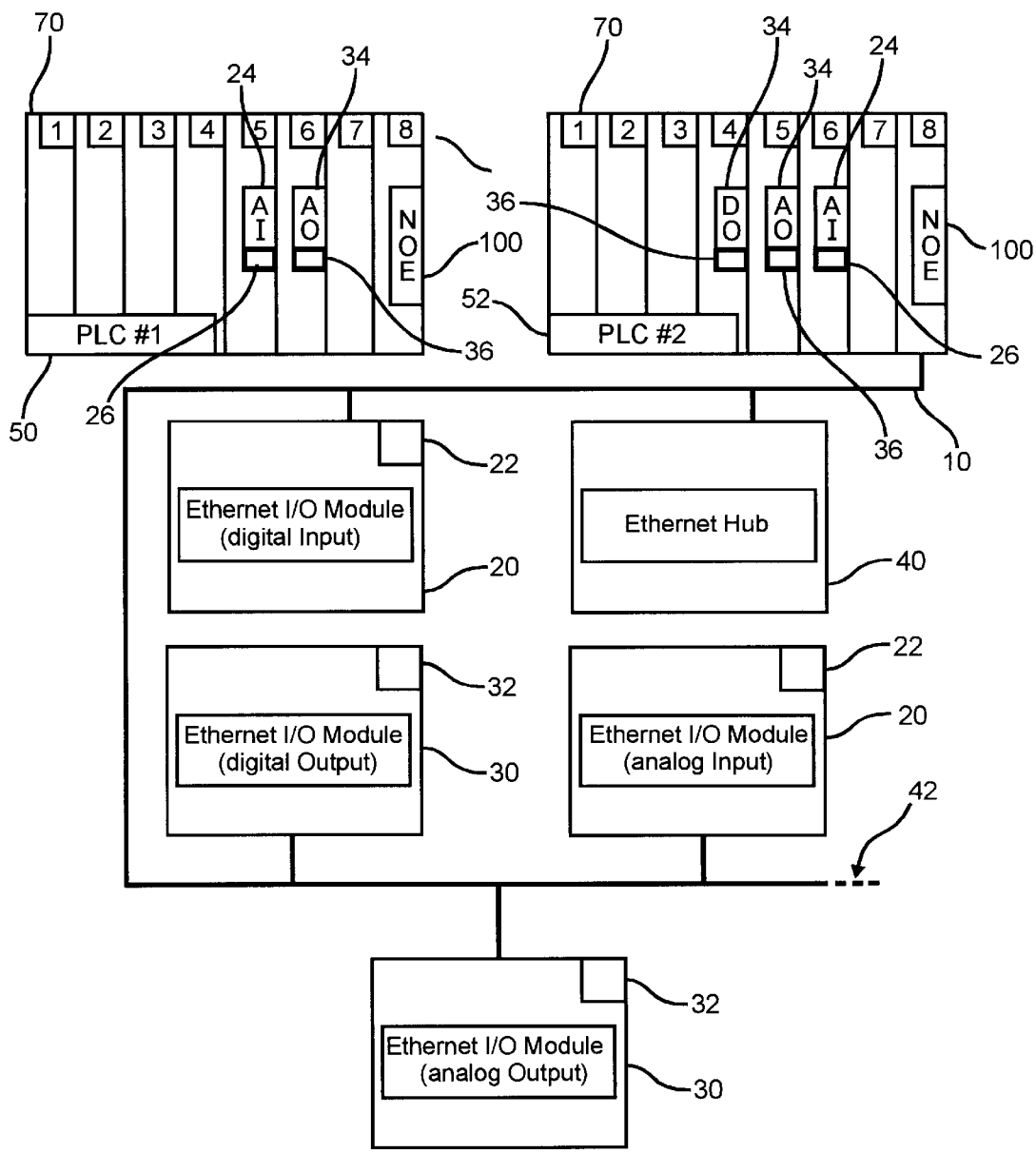
FIG. 1 is a functional block network diagram of an example of a control system network over Ethernet of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
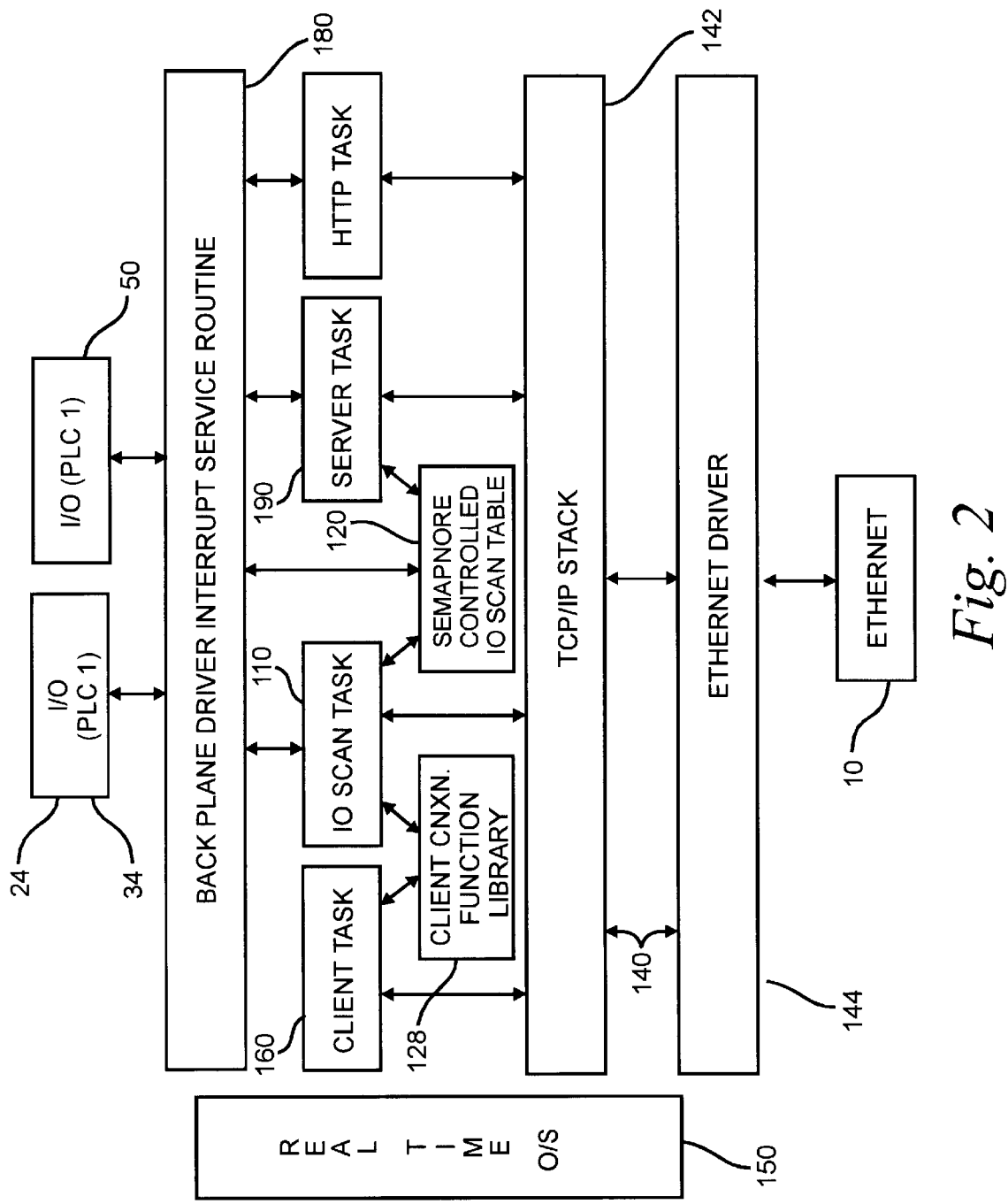
FIG. 2 is a functional block diagram of one embodiment of the present invention and the connections to other portions of the control system of the present invention.

Referring to FIGS. 1 and 2, one embodiment of the present invention is an apparatus for communication with at least one device 22, 26, 32, and/or 36, which resides on a standard communications network 10, such as an Ethernet network, using a standard communications protocol, such as TCP. The apparatus has a scanner 110, which resides within the element labeled as the "NOE" 100 in FIG. 1. "NOE" stands for Network Options Ethernet module or card. In the embodiment/example shown in FIG. 1, the NOE is a communications card which fits into a backplane 70 having several slots (eight in FIG. 1) for various cards/modules, such as local input modules 24 and local output modules 34, within the control system. One embodiment of the present invention is implemented with software (also referred to as firmware, or Exec), which runs on the NOE module having a microprocessor and memory. However, the present invention can be implemented in various different ways, such as having the scanner 110 residing on the PLC 50, 52 itself, depending on the implementation of the invention. The device scanner is provided for scanning the devices 22, 26, 32, 36, both locally (located on its own backplane) or remotely (over the standard communications network, shown as an Ethernet network in the Figures). A device scan table 120 is provided for storing data relating to the devices 22, 26, 32, 36. A standard communications interface 140, such as a TCP/IP stack with an Ethernet driver, is provided for interfacing between the device scanner 110 and the standard communications network 10 using the standard communication protocol, such as TCP. The Ethernet network embodiment of the present invention uses Ethernet as the device level 10 network. This provides a fast, flexible, and convenient way of interconnecting the I/O devices of different PLCs or I/O modules to the PLCs.

The device scan table 120 includes several parameters which can be used by the scanner 110 to communicate with the devices 22, 26, 32, 36. A listing of the parameters in one specific embodiment of the present invention are provided in a chart further below. Some of these parameters within the scan table 120 are as follows: a first scan parameter is provided for indicating the number of devices 22, 26, 32, 36 to be scanned by the device scanner 110. A second scan parameter is provided for indicating a device type. A third scan parameter is provided for indicating where to retrieve and store data for the devices 22, 26, 32, 36. A fifth scan parameter is provided for indicating the length of the stored data and the retrieved data.

Within the control system, the programmable logic controllers (PLC) 50, 52 communicate between themselves and with other devices using a PLC communication protocol. One such protocol is Modbus, a known protocol. In the present embodiment, the PLC communications protocol is communicated over the standard communications protocol, such as TCP. Detailed information on the Modbus protocol and TCP and TCP/IP can be found on the Internet at www.modicon.com, and other locations, including documentation listed as "Open Modbus/TCP Specification," which is hereby incorporated by reference into the present specification. The standard communications network 10 provides communication between the device scanner 110 and the remote devices 22, 32 and modules 20, 30. Within FIG. 1, element 42 depicts that many other devices can be connected to the standard communications network 10, as is well known. As indicated above, in one specific embodiment of the present invention, the I/O scanner 110 scans the I/O devices by using the Modbus™ protocol (from Schneider Automation, Inc.) over TCP/IP. In this embodiment, the I/O scanner 110 uses the read registers, write registers, and the read/write registers' Modbus commands to move data to and from the PLC memory. This will allow specific types of PLCs within the control system to efficiently transfer repetitive data to Ethernet modules, other types of PLCs, and any other Ethernet TCP/IP device that supports the MB (Modbus) protocol.

The control system shown in FIG. 1 can have numerous PLCs 50, 52. Each PLC 50, 52 typically has a microprocessor and memory (PLC memory such as Random Access Memory—RAM), with software or firmware running therein. Within the embodiment shown in FIGS. 1 and 2, the PLCs 50, 52 each have PLC memory that includes a configuration table. The PLC memory configuration table can have the same parameters listed within the scan table 120 listed above and/or listed within the table of parameters further below. In the embodiment using a configuration table within the PLC memory, the parameters within the configuration table of the PLC memory are read into the scan table 120 upon start-up of the NOE 100 and/or device scanner 110. However, other embodiments of the present invention can have the parameters read into the scan table 120 by other means, such as through a web page (accessible through the world wide web (www)) located on the NOE itself. This type of NOE could generally be called a web-embedded server module. Alternatively, the parameters could be placed into the scan table through a user creating/editing a file on the user's personal computer, and the user could send the file to the NOE using a File Transfer Protocol (FTP) or some other transfer means from a remote location.

In the embodiment shown in FIGS. 1 and 2, the PLCs 50, 52 are adapted to communicate with the local input and output (I/O) devices 26, 36 through the back plane 70, and with the remote input and output (I/O) devices 22, 32 through the back plane 70, the NOE 100, the network 10, and the I/O modules 20, 30 on the network 10. The NOE 100 in the embodiment in FIGS. 1 and 2 is adapted for communication with the PLC 50, 52, the local input and output devices 26, 36, the Ethernet network, 10 and the remote input and output devices 22, 32. As stated above, and as will be described in detail further below, the NOE server module 100 has a scanner 110 for scanning the input and output devices, an I/O scan table 120 for storing real time and other information for the input and output devices, a standard communication protocol interface 142 and a standard communication network driver 144 for interfacing between the I/O scanner 110 and the standard communication network 10 using the standard communication protocol. The standard communications network driver 144 can be a commercially available AM79C961 Driver.

In the embodiment shown in FIGS. 1 and 2, the NOE module 100 also has a real time operating system for running the various tasks on the NOE, including the "IO scan task" or scanner 110. Commercially available operating systems can be used, such as the PSOS real time operating system manufactured by Integrated Systems, Inc. of Sunnyvale, Calif. Information on the PSOS real time operating system is available from this company and/or on the Internet at www.isi.com. One preferred real time operating system that can be used is VXWORKS provided by a company named Wind River Systems, Inc. of Alameda, Calif. VXWORKS has been used within the QUANTUM product line of Schneider Automation, Inc., the Assignee of the present invention. Some of the embodiments of the present invention do not need a real time operating system, such as the "M1" product line of Schneider Automation, Inc., in which case, the firmware runs on a processor without the assistance of the real time operating system.

In one embodiment, the operation of the scanner 110 is configured using a commercially available panel software applications, such as Modsoft™ or Concept™. The panel software is used to input the information about I/O devices, which are to be scanned by the NOE, that is, to be written to and read from.

In a particular embodiment of the present invention, the scan table 120 includes: the number of 16-bit words that the device accepts as input or produces as output; the source or destination address in the controller memory space (referred to as OX, 1X, 3X, or 4X Registers); the timeout value for a device, which is the amount of time which is allowed to elapse before a device is considered to be unhealthy; a flag to indicate what to do with input data when a device has stopped responding, the two choices are HOLD or ZERO. This implementation produces the IP address of the device from its Modbus address as follows:

Device's IP Address: AA.BB.CC.MB

AA.BB.CC is the $1^{st}$ 3 octets of this NOE's IP address, and MB is the Modbus Address which has been entered with the panel software. A further embodiment includes the ability to directly enter the remote I/O devices, IP addresses, as well as the device types.

A TCP connection shall be reserved for each I/O device in the scan list, until the maximum of 128 devices are reached. As used within this specification, FC 3 means function code 3, which is a MB (Modbus) read register message. Likewise, FC 16 means function code 16, is also an MB write register message, and FC 23 means function code 23, which is an MB read/write message. The preferred embodiment of the present invention is capable of supporting Peer Cop, the name of a particular control system arrangement of Schneider Automation, Inc., which is described in U.S. patent application serial No. 60/078,223, entitled Communications System For A Control System Over Ethernet And IP Networks and Communications Interfaces for Such Systems," which is hereby incorporated by reference into the present specification. Additional information on "peer cop" is also available on the Internet at www.modicon.com, which is hereby incorporated by reference herein. In this embodiment, the user can use the peer cop input screens in the panel software to configure the NOE, including the I/O scan table, although there are other ways to configure the NOE, as are described within the present specification.

Figure 3:
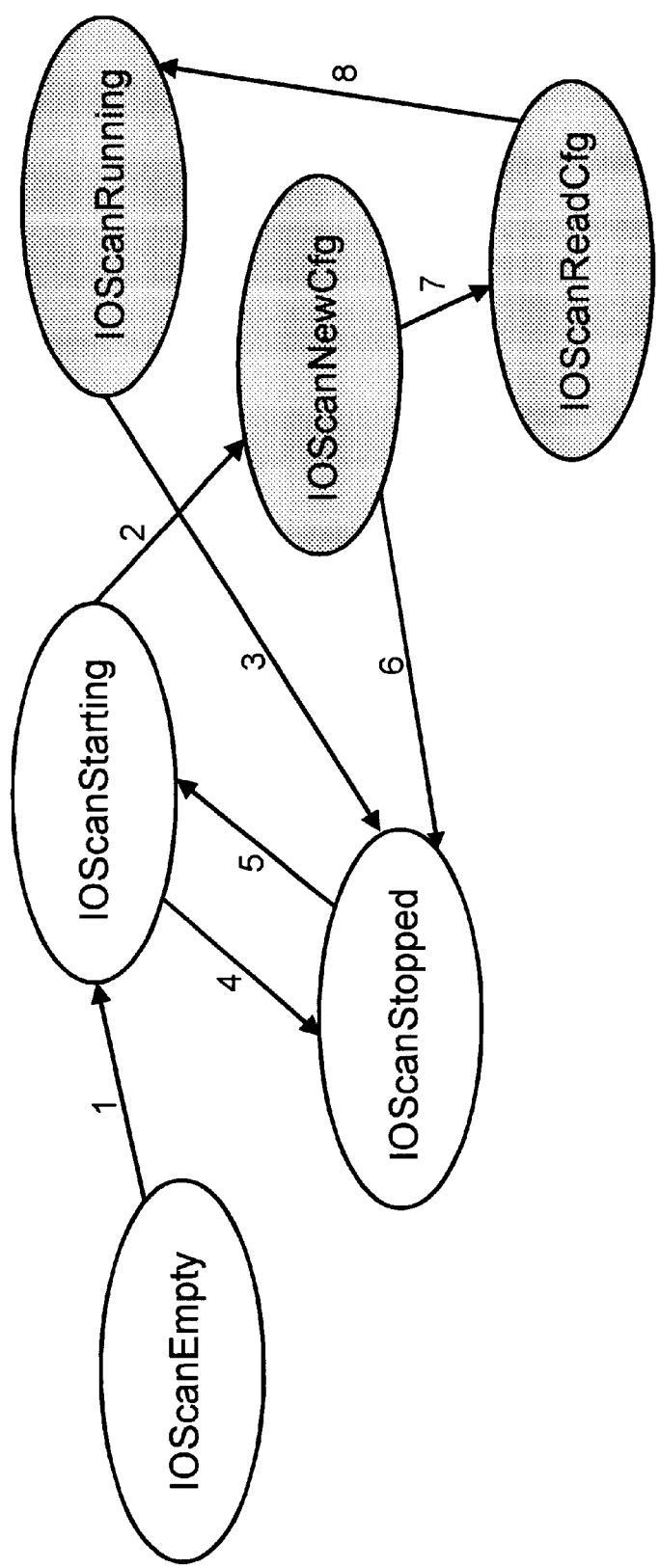
FIG. 3 is a state diagram of the control states of a scanner of present invention.

The general setup and flow of the I/O scanner software/firmware is shown in FIG. 3. The following next state transition table indicates the next states of the next state diagram of FIG. 3.

| Current State | Next State | Trigger Number | Trigger |
|---|---|---|---|
| IOScanEmpty | IOScanStarting | 1 | ExitDim |
| IOScanStarting | IOScanNewCfg | 2 | New Cfg. From controller and Controller is running |
| IOScanRunning | IOScanStopped | 3 | Controller Not Running |
| IOScanNewCfg | IOScanStopped | 6 | Controller Not Running |
| IOScanStarting | IOScanStopped | 4 | Controller Not Running |
| IOScanStopped | IOScanStarting | 5 | ExitDim |
| IOScanNewCfg | IOScanReadCfg | 7 | IOScanState still IOScannewCfg |
| IOScanReadCfg | IOScanRunning | 8 | IOScanState still IOScanReadCfg and Open IOScan connections |

In one embodiment, the I/O scanner 110 utilizes the event flag capability of the PSOS real-time operating system (RTOS). This allows up to 16 user defined events to be posted to a task. The I/O scanner interface to the backplane (BP) driver is via a call-back function. The BP driver calls the call back function to interface to the I/O scanner 110. The call back function posts the appropriate event to the I/O scanner 110. The I/O scanner 110 runs in a forever loop, checking for events. If an event is posted, the I/O scanner 110 carries out the appropriate function. The event flag communication within the PSOS RTOS does not provide the full functionality of the message queue communication method, but requires much less system resources. Event flags do not need to be queued in this embodiment.

The I/O scanner 110 utilizes the services of a client task 160 to implement I/O scanning. The client portion or task 160 is the portion of the NOE 100 which handles the "client" tasks. For example, the user can write a control program for the PLC 50 which, as a part of the operation of the program on the PLC, the PLC will send/receive a Modbus message to/from the backplane 70, and these types of messages will be handled by the client task 160 to/from TCP/IP stack 142 and Ethernet driver 144. Parameters are used to pass pointers for connection list and connection arrays.

With reference to the above next state transition table and FIG. 3, there is no processing required during the IOScanEmpty state. The backplane driver initializes the I/O scan table 120 through existing or created configuration data located elsewhere, as has been described herein. During the IOScanNewCfg State the I/O scanner disables interrupts, and tests to see if the state is still IOScanNewCfg. If the state is IOScanNewCfg, the IO scanner 110 task changes the IO Scan state to IOScanReadCfg, and re-enables interrupts. The I/O scanner 110 also performs the necessary housekeeping, to remove any previously used open connections. If the test for IOScanNewCfg fails, then the IO scanner 110 re-enables interrupts and exits. The IO scanner 110 copies the IO scan data structure to its own local variable to ensure that here will not be a contention issue with the BackPlane Driver trying to access the data at the same time.

Another aspect of present invention includes a "peer" determination portion that among other things, was implemented to allow for versatility of the control system. As will be described in greater detail below, one particular embodiment of the present invention includes using two determinations to determine whether a device (in the scan list) is a peer: (1) Does the device understand the Modbus read/write register command (Function Code 23) and (2) does the information in the scan table 120 match the communication that the remote device is directing at this node? If these two conditions are met then the device is determined to be a "peer" device.

Figure 4:
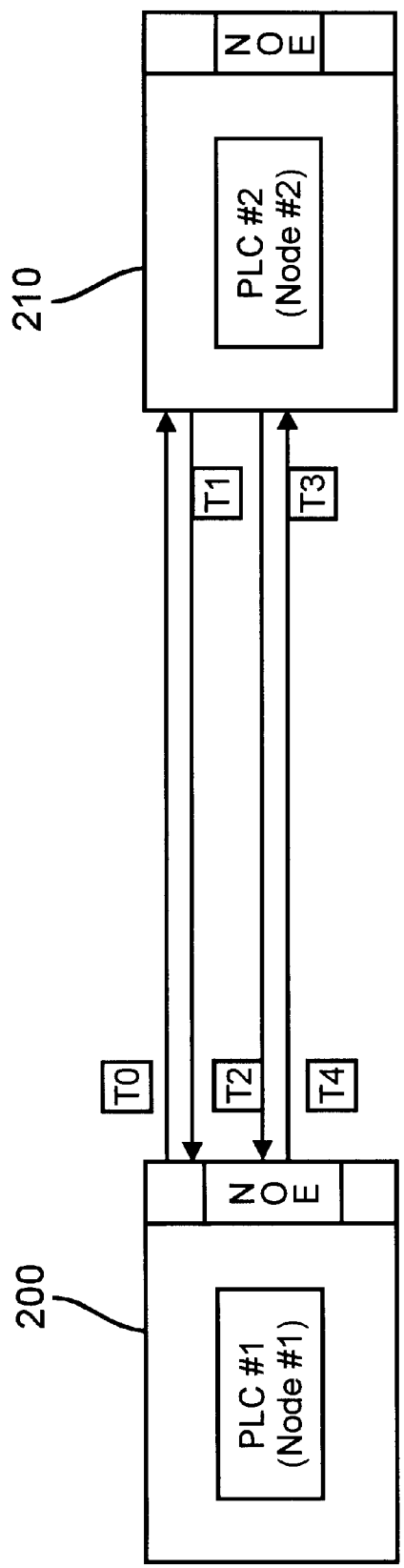
FIG. 4 is functional block and timing diagram of one embodiment of peer device determination of the present invention.
Figure 5A:
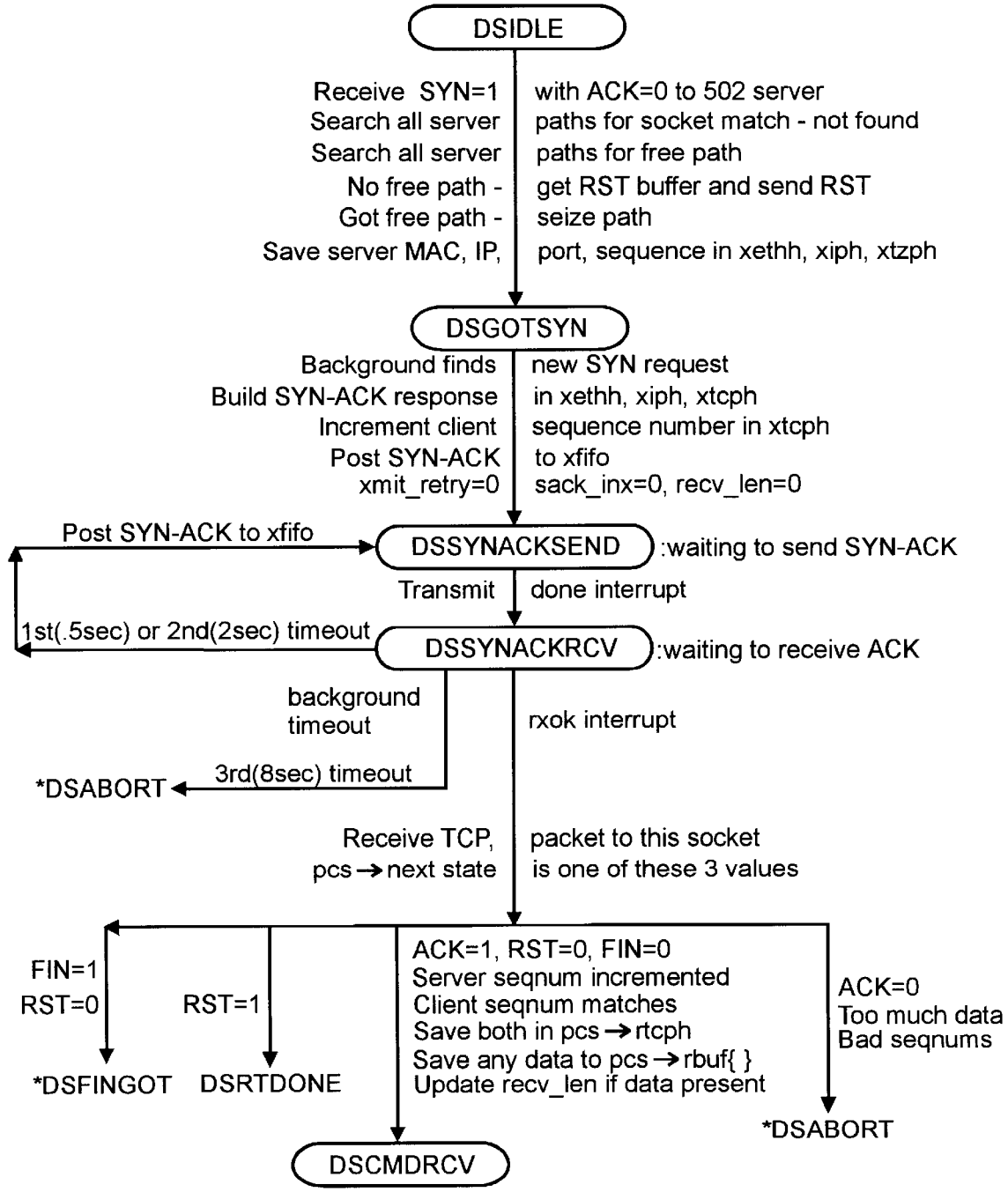
FIGS. 5A–5G are a detailed flowchart of the one embodiment of software code running on one embodiment of the scanner of the present invention.
Figure 5B:
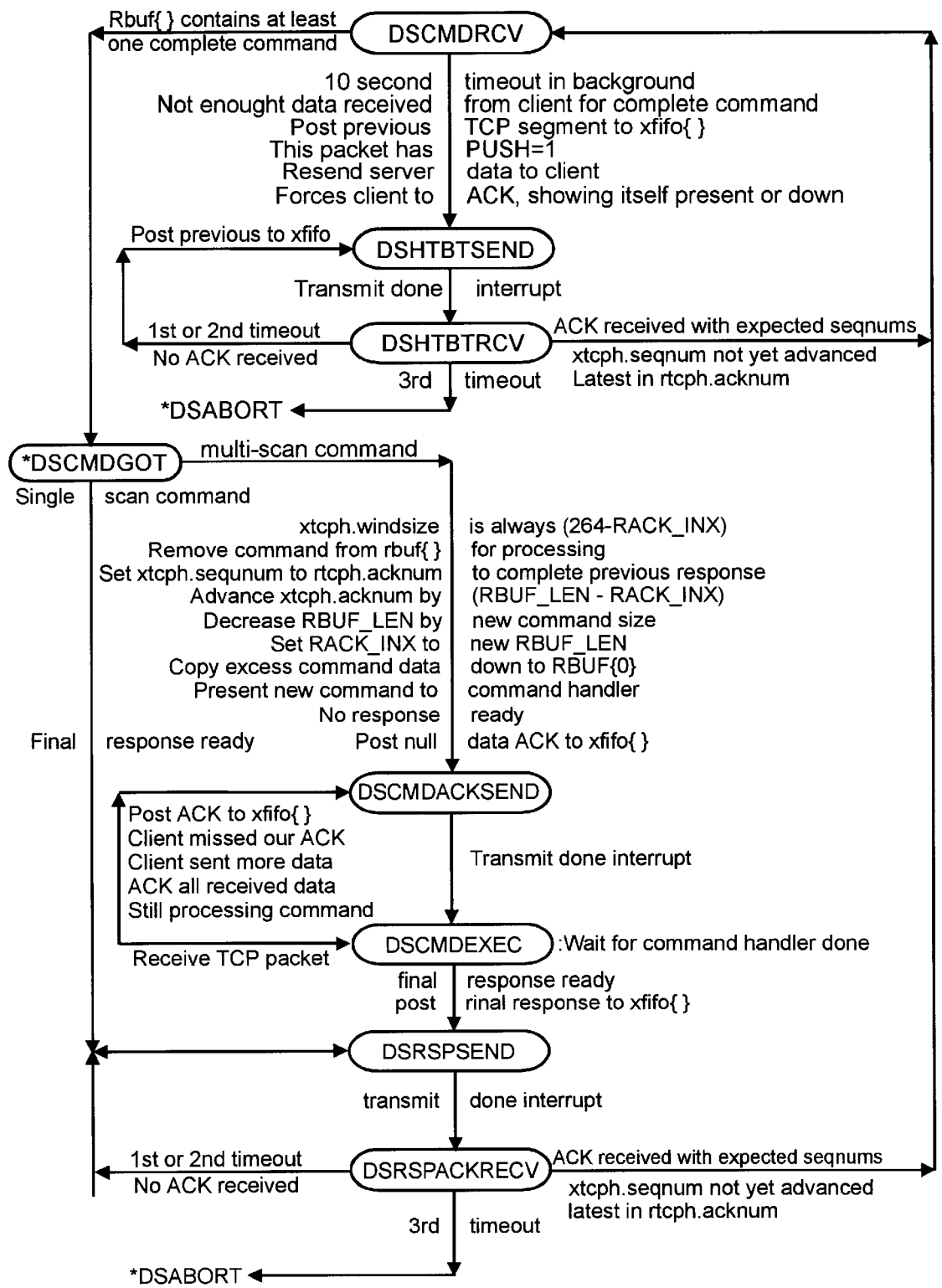
Figure 5C:
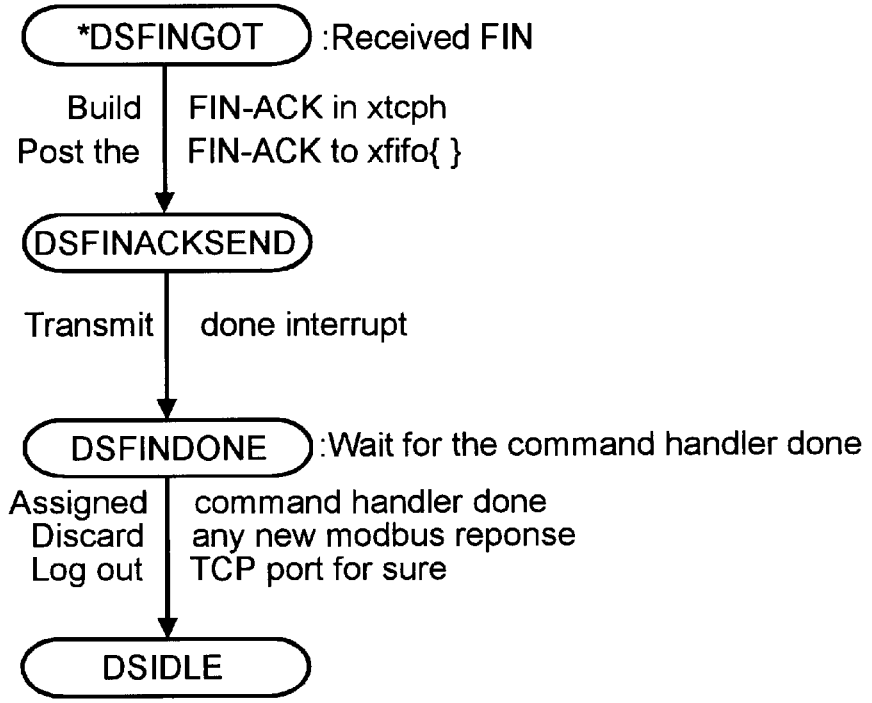
Figure 5C:
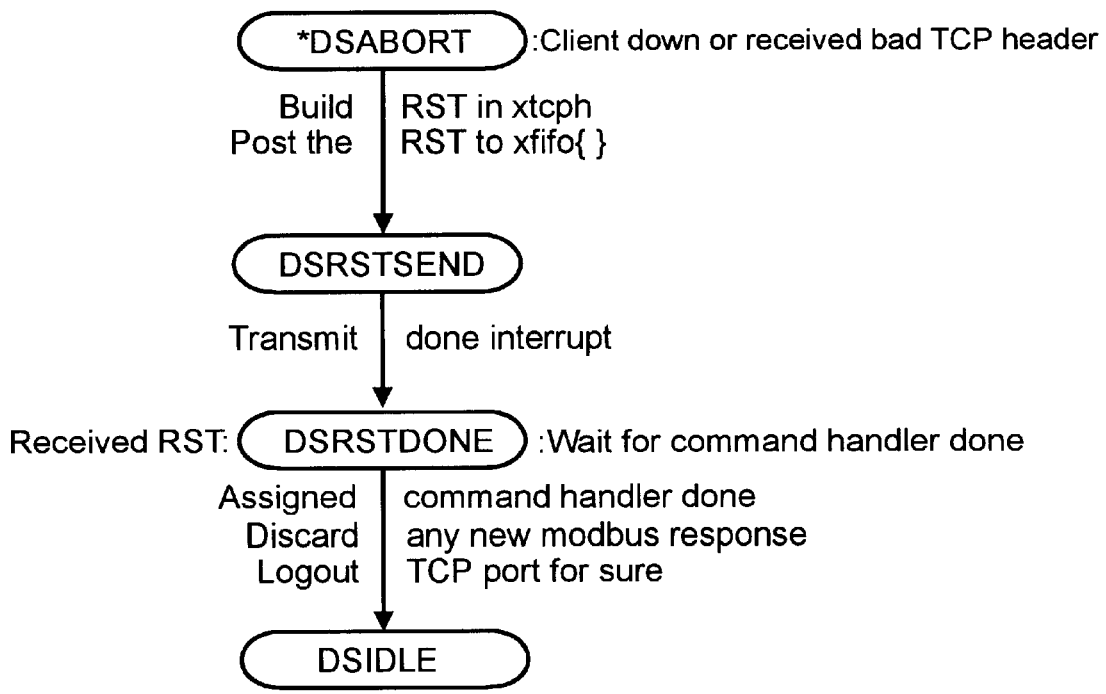
Figure 5D:
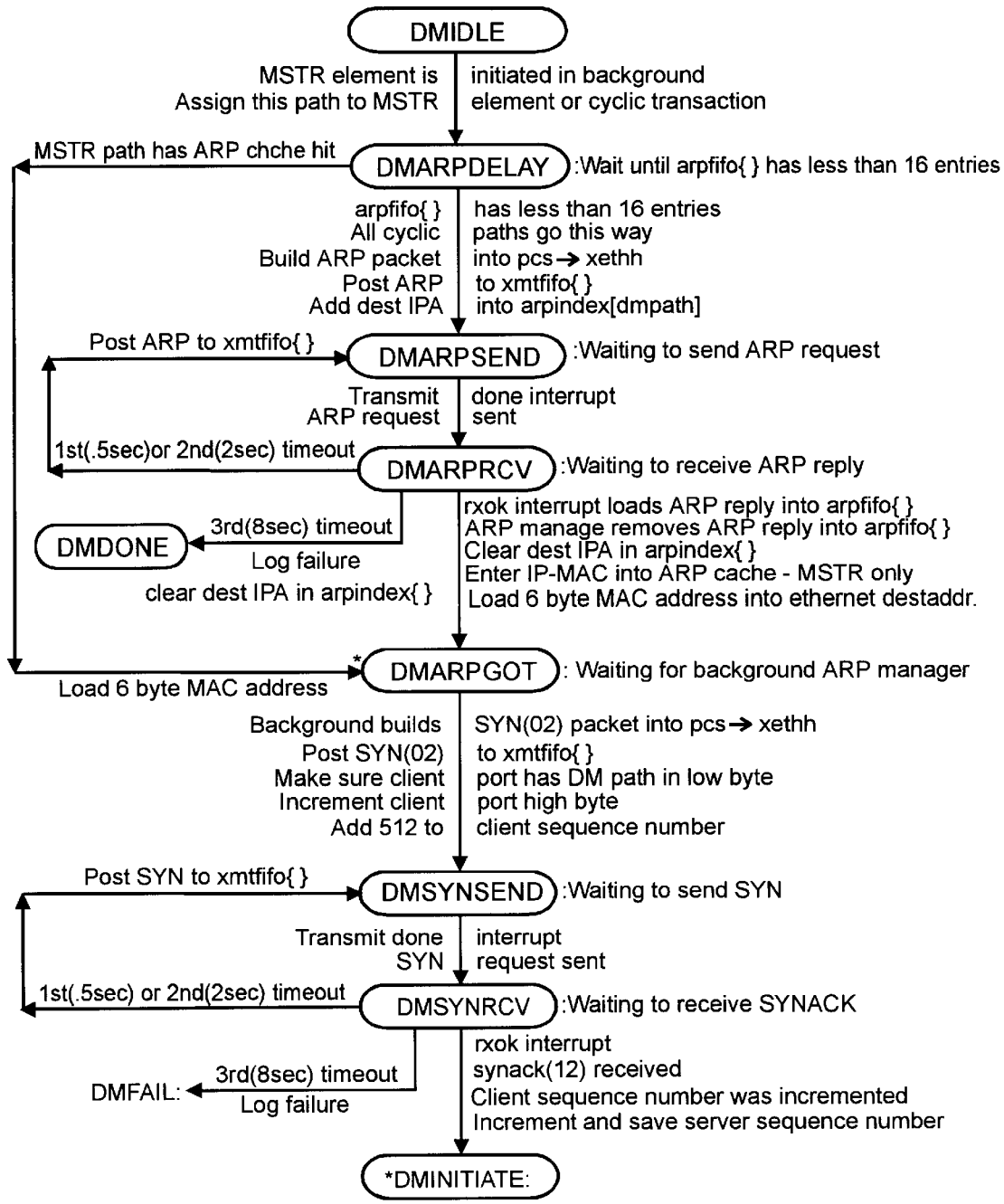
Figure 5E:
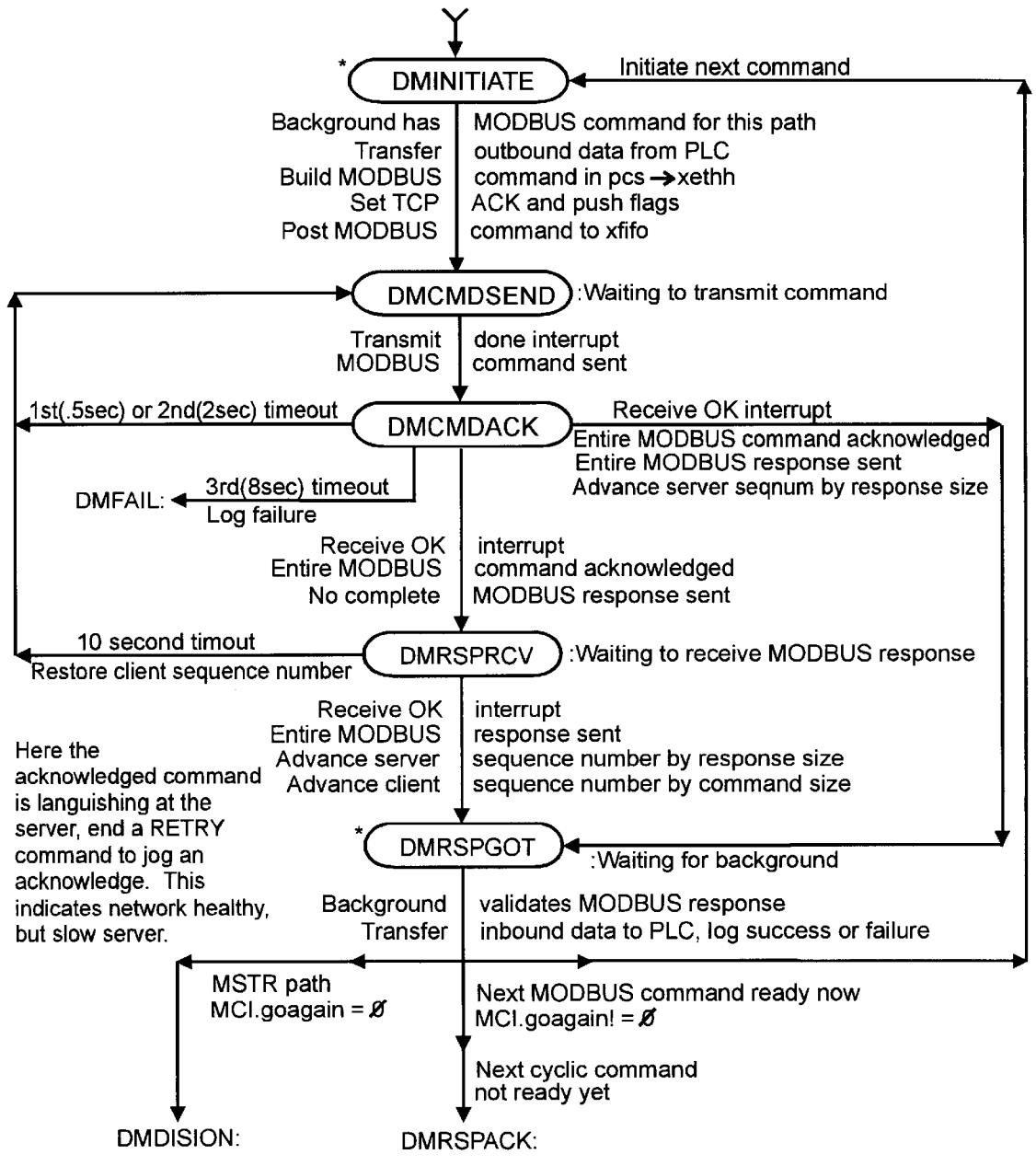
Figure 5F:
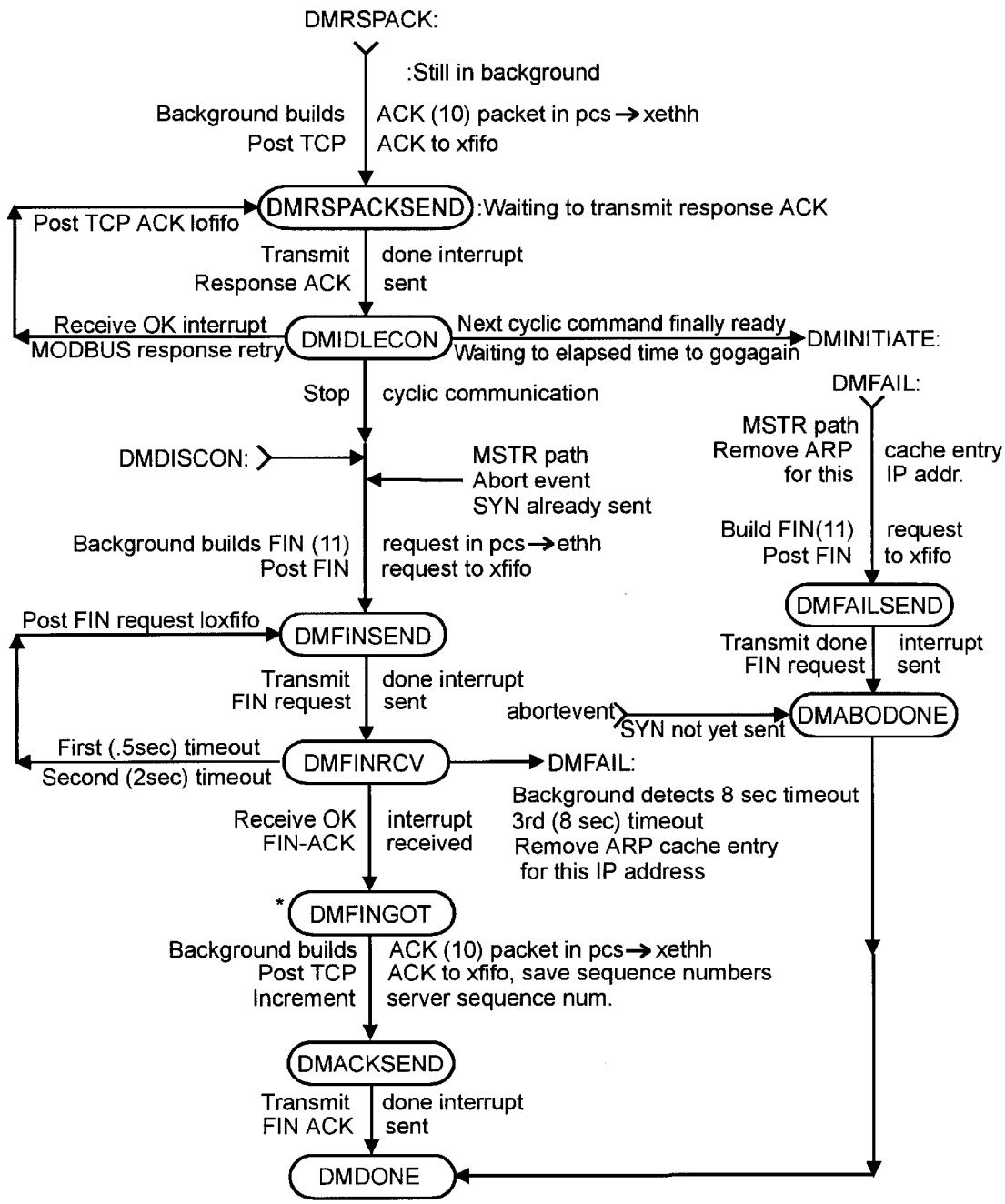
Figure 5G:
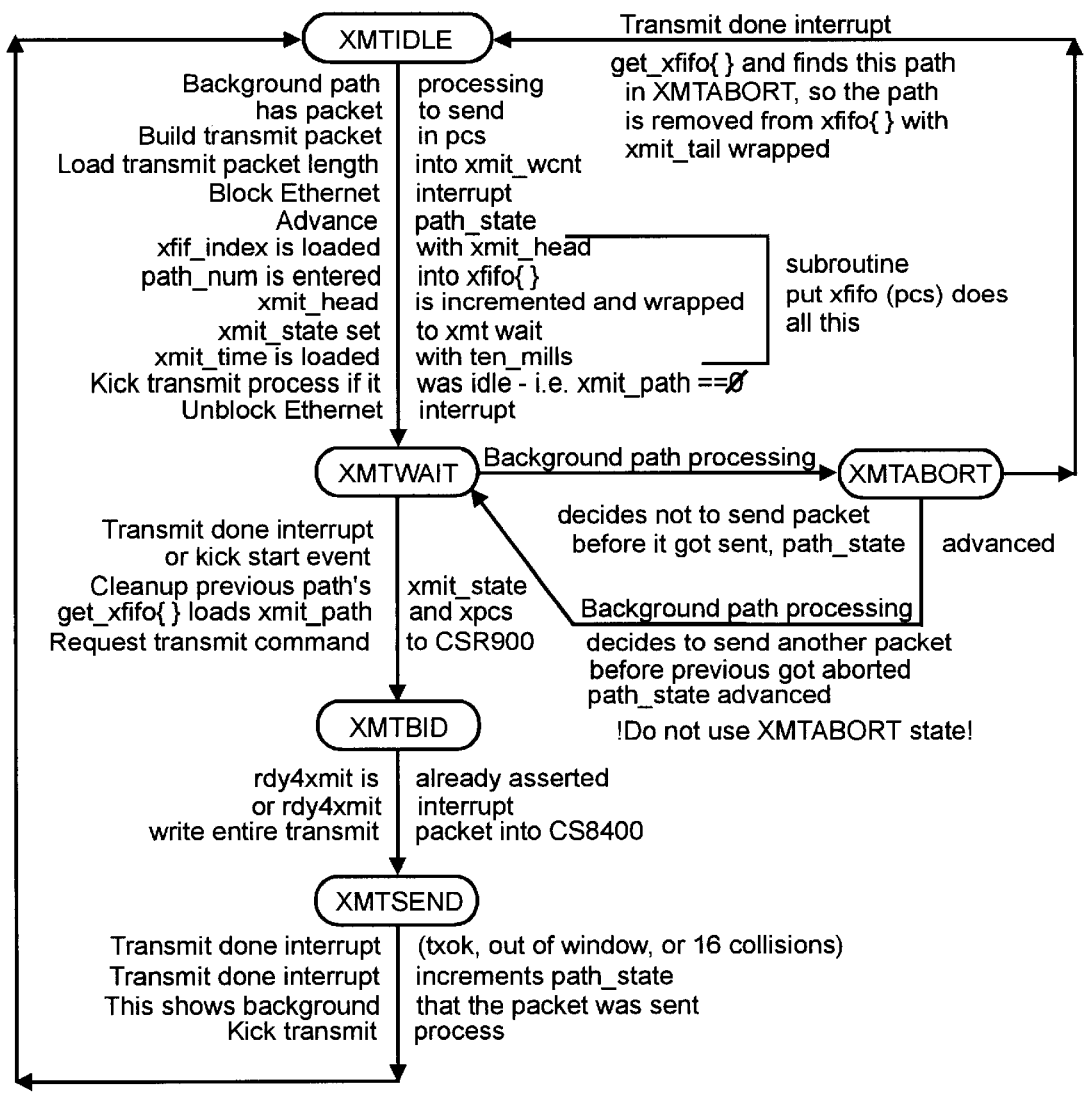

Referring to FIG. 4, in view of FIGS. 1 through 3, in general, the present invention is a method for identifying a second device 210 on a second node of a standard communications network 10 from a first device 200 located on a first node of the standard communications network 10. The method first initiates from the first node a first communications command in a peer protocol format to the second node. The method then responds to the first communications command from the second node to the first node. The method then initiates from the second node a second communications command in the peer protocol format to the first node. The method then responds to the second communications command from the first node to the second node. The method then identifies the second device on the second node as a peer device within the first device on the first node, and the method identifies the first device on the first node as a peer device within the second device on the second node. The method then sets the first node to an active status, and sets the second node to a passive status. In one embodiment, the peer protocol format can be a programmable logic controller (PLC) format, the peer device can be a programmable logic controller (PLC) device, the peer protocol format can be Modbus, and the standard communications network can be Ethernet.

The present invention is also a device scanner 110 for a first device 200 located on a first node of a standard communications network 10, for scanning devices on the standard communications network 10, and for identifying a second device 210 on a second node of the standard communications network 10. The device scanner 110 has an initiator for initiating a first communications command in a peer protocol format to the second node, a receptor for receiving from the second node a second communications command in the peer protocol format, in response to the first communications command, and an identifier for identifying the second device 210 on the second node as a peer device. The device scanner 110 can have the scan table 120 of prior embodiments built into the device scanner 110 or as a separate portion of the system for storing parameters relating to the devices. As in prior embodiments, the scanner 110 uses one or more of the parameters for scanning the devices.

In one particular embodiment, if communication has been initiated by a device which is in the scan table 120, that is, a device which this NOE 100 has been configured to also communicate with, then the peer determination test is performed. As indicated above, the peer determination includes at least the following aspects: 1) Does the remote device understand the read/write register command? 2) Does the communication from the remote device match the characteristics of this scan table 120. That is, does the write length match the read length in the scan table, and does the read length match the write length in the scan table 120. If (1) and (2) are met then the device is flagged as a "peer." There are two peer types: peer active and peer passive. The active peer takes over the task of initiating the scanning, while the passive peer only keeps track of the health of the active peer.

More particularly, as a part of its operation, the I/O scanner 110 determines during initialization whether an I/O device listed in the I/O scan table 120 is a peer device, which will actively initiate transfers, or a simple slave device, in which case the I/O Scanner must issue MB reads or writes to get or receive data. To determine peer status, the I/O scanner 110 issues a MB read/write request (which is FC 23)

to the I/O device. If the /IO device responds with an exception indicating that it does not support the read/write request, then the I/O device is assumed to be a simple device, and therefore this I/O scanner 110 must initiate all requests for input data. If the device responds positively then it may or may not be a peer. The next qualifying event to declare the I/O device a peer is the arrival of a read/write request from the peer I/O device. If the read/write request is received and the input and output length match the configuration in this I/O scanner's scan table 120 then the device is declared a peer.

As briefly mentioned above, when a device is declared a peer, then the I/O devices IP addresses are used to decide which I/O device will be "active" and which I/O device will be "passive." By convention, the I/O device with the lower IP address will become active (lower=active) and the device with the higher IP address will become passive (higher= passive) in the I/O scanning process. The active device initiates the read, write, or read/write request to the passive I/O device. The passive device accepts/provides data in response to the active I/O device's requests. FIG. 4 shows the timeline for the peer determination:

T0—Node #1 initiates a Read/Write MSTR to Node #2.

T1—Node #2 responds to Node #1's request.

T2—Node #2 initiates a Read/Write MSTR to Node #1.

T3—Node #1 responds to Node #2's request.

T4—Node #1 declares Node #2 a Peer.

Node #2 then declares Node #1 a Peer.

Node #1 then becomes active and Node #2 becomes peer passive.

The following provides additional detail of one embodiment of the scanner 110 and scan table 120 of the present invention. The I/O scan table 120 allows up to a maximum of a 128 input devices and a maximum of 128 output devices. The I/O scan table allows up to a 100 words of data to be sent to or from a device in the I/O scan table 120. The format of the I/O scan table 120 is as follows:

| Entry Name | Data Type | Description | Default Value |
| --- | --- | --- | --- |
| IQDevType | Uint8 | Device Type: Indicates the type of IO device | SLAVE_INPUT |
| Ipaddr | Uint32 | IP address of IO Device | Derived from MB+ address |
| MbpAddr | Uint8 | MB+ Address of IO Device | Value from Peer Cop Table |
| LastRespRecv | Uint8 | Flag indicating whether the IO device responded to the last MB message | Reset when MB message sent. Set when response received |
| HealthTimeOutValue | Uint16 | Indicates the amount of time t wait before declaring an IO device unhealthy | Value from Peer Cop Table |
| Status | Uint8 | Indicates the status of the IO Device: UNCONNECTED, CONNECTED, TIMEDOUT. | UNCONNECTED |

-continued

| Entry Name | Data Type | Description | Default Value |
| --- | --- | --- | --- |
| HealthTimer | Uint16 | Used internally for current value of Health Timer | Updated once per scan. LSB is 16.67 mSec (from KC_TICKS-2SEC). |
| InputLocalRefNum | Uint16 | Local state RAM reference | Value from Peer Cop Table |
| InputRemoteRefNum | Uint16 | Remote state RAM reference | 0x00 |
| InputLength | Uint16 | Length of Input Data | Value from Peer Cop Table |
| HoldLastValue | Uint8 | Indicates whether to hold the last value, or reset value to 0 when IO device is declared unhealthy | Value from Peer Cop Table |
| NewInputDataAvailable | Uint8 | Indicates whether new input data has been received | Set when new data received, cleared when data is given to BP Driver. |
| IOScanDataInTblIndex | Uint16 | Index into the IO Scan Input Data Table | Derived at initialization time |
| OutputLocalRefNum | Uint16 | Local state RAM reference | Value from Peer Cop Table |
| OutputRemoteRefNum | Uint16 | Remote state RAM reference | 0x00 |
| Output Length | Uint16 | Length of Output Data | Value from Peer Cop Table |
| IOScanDataOutTblIndex | Uint16 | Index into the IO Scan Output Data Table | Derived at initialization time |

During the IOScanReadCfg state, the I/O scanner 10 initializes the connection and transaction arrays, then transitions to the IOScanRunning state. During the IOScanRunning state, the I/O scanner is issuing write/read registers(FC 23) to I/O devices in the scan table 120 that have both inputs and outputs, write4x register, and read4x register commands to I/O devices the scan table 120. The data received back from the read4x responses is sent to the backplane driver to update the controller memory.

The following describes with more particularity the peer active processing of one embodiment of the present invention. In the I/O peer case, the initial FC 23 from the peer, of the peer determination will be received by the server or server task 190, as well as, the FC 23s from peer active devices. The server 190 will determine whether the device associated with an incoming FC 23 is in the I/O scanner's I/O scan table 120. If it is, the server 190 will take control of the I/O scan table 120 by using the I/O scan table semaphore. Once the server 190 has control of the I/O scan table 120, the server 190 will determine whether the device associated with the incoming FC 23 is already flagged a peer, or is listed as a slave.

If the device is listed as a slave in the I/O scan table, then this FC 23 is part of the peer determination The server 190 then posts a IOSCAN_PEER_DETERMINATION_EVENT to the I/O scanner 110. Upon receipt of the IOSCAN_PEER_DETERMINATION_EVENT the I/O scanner 110 will update the status of the device to either peer active or peer passive, based on the IP addresses. If the device is listed as peer active, then this FC 23 is the I/O scan data associated with this peer. The server 190 will take control of the I/O scan table 120 by claiming the semaphore. The server 190 will write the new data into the I/O scan table 120 and update the NewInputDataAvailable flag. The server 190 will then release the I/O scan table 120 semaphore. If the output data length is non-zero, the server 190 will take control of the I/O scan table 120, and write the output data in the response to the FC 23 to the peer. The I/O scan table 120 can be broken down into two or more groups in order have the server 190 and/or the scanner 110 take control of only one or more groups therein and allow for access of the other groups by the other task. In peer passive, the response to the peer data exchange is received directly by the IO scanner 110, and is treated the same as the slave case.

The following describes with more particularity the input device scan operation of one embodiment of the present invention. While the I/O scanner 110 is in the IOScanRunning state, the BP driver sends an event to the I/O scanner 110 at each End of Scan (EOS). The transmission of the request for data for each input in the Scan Table is performed at the EOS. The I/O scanner 110 sends a FC 23 or FC 3 for each slave input, and peer active input in the scan table 120, if the device has responded to the previous request for data. The I/O scanner 110 clears the I/O data received flag for each request that is sent. The input data that is received as a result of the FC 23 or FC 3 commands that were transmitted will cause a IOSCAN TCIP_EVENT to be caused. This event is generated by the TCPSignalHandler function. The IOSCAN_TCIP_EVENT is handled by the I/O scanner 110 by determining which connection the response was received over, and setting the I/O data received flag for that device. The health timer is reset, and the health bit is set for the device.

The following describes with more particularity the ouput device scan operation of one embodiment of the present invention. Following the input device scan operation, the output devices are scanned. The output data is sent to each slave output, and peer active output in the scan list if the device has acknowledged the previous output data. When a device on the output scan list acknowledges the receipt of the output data, the health timer for the device is reset, and the health bit is set. To maintain consistency for all output data sent each scan, the I/O scanner 110 double buffers the output data before the starting the output of the data for each scan. Thus, if the BP driver updated part of the output data, while the I/O scanner 110 was in the middle of a transmission, the current set of data being output would not be affected.

The following describes with more particularity the I/O device health information operation of one embodiment of the present invention. The health timer for each device is initially set to the health time-out value in the I/O scan table 120. The real time operating system timer 150 capability is used to maintain the health timers for each device in the I/O Scan table 120. The RTOS 150 system timer is configured to generate an event to the I/O scanner 110 every 16.67 mSec. This is accomplished via the tm_evevery(unsigned long ticks, unsigned long events, unsigned long *tmid) function call(see PSOS documentation for more details). This configures a timer that will automatically reload. Every time the timer expires, an event is generated to the I/O scanner 110 indicating that the health timers need to be decremented. Following the update, any device whose health timer has expired, are flagged as bad by resetting the health bit for the device. Any time data is received from an input device or an acknowledge is received from an output device, the health timer for that device is set to the initial health time-out value. In order to use the I/O device health information with the current MSTR to get "peer cop" health, a 128 bit array will be used to provide health information for 128 devices. Otherwise, health will be provided for the first 64 devices. The I/O scan table 120 will be sorted for ascending IP addresses. Each bit in the 128 bit array indicates the health of one of the I/O devices. The I/O scanner 110 is capable of 1,000 transactions per second.

The following provides additional information on the relationship between the I/O scanner 110, the server 190, and the backplane driver 180. In one embodiment of the present invention, three components are used to perform I/O scanning: the backplane driver 180, the server 190, and the I/O scanner 110. A double buffer scan table and a double buffer output table is used. The double buffer output table is used for outgoing write requests. An input table is also used for outgoing read requests. A health array is also used. When the configuration changes, the backplane driver 190 copies the configuration from the PLC 50 into one configuration table while the client and server tasks are using another configuration table. When the backplane driver 190 has completed copying the configuration, it signals the client I/O scanner 110 task by setting the event flag. The client task 160 then swaps the tables, and the new table will also be used by the server 190. It is the client task 160 that determines which tables (configuration and output) are used by the server 190 and backplane driver 180. It does this with one variable for the configuration table and another variable for the output table. The server 190 and backplane driver 180 reads the appropriate variable and determines the table to use, and the client task 160 sets the appropriate variable. The server 190 examines if the read, write or read-write request from the remote node has a corresponding entry in the scan table 120. If not, the request is processed in the normal manner by passing the request to the backplane driver 180. If there is a corresponding entry, the server 190 processes it using the input and output tables. To save bandwidth, the server 190 compares its IP address with the remote node. If its IP address is greater than the remote node, it goes into passive mode, and changes the state in the scan table 120. At a later time, when the client task 160 notices that its in a passive state, it no longer sends modbus requests to the remote node. Thus, bandwidth is saved by sending less messages.

Referring back to embodiment in FIGS. 1 and 2, the I/O scanner 110 handles the cyclic communication, the server 190 communicates directly with a dual port RAM and an ASIC which is directly connected to a bus that runs accross the backplane 70 which in turn connects to the PLC 50. The backplane driver 180 handles communication to/from the controller. As discussed above, the PLC 50 has configuration tables which stores, at least, the number of devices to be scanned, whether a device is an input, and output, or and input and output device. If a device is an input, the table stores where in the controller's memory to store the data. If the device is an output, the table stores where in the memory to retrieve the data. If the device is both an input and output device, the table stores both. The configuration table also stores the length (in bytes) of the input and output data. As described in detail above, the configuration table also includes a health timeout parameter for each device. If there is no response to a read/write to an I/O device within the timeout parameter amount, the device can be "flagged" as unhealthy in the NOE 100. The NOE 100 keeps track of the dynamic health status.

In this embodiment, the configuration table is scanned by the NOE 100, and then the NOE 100 operates according to those parameters. The controller (PLC) 50, 52 runs in a cyclic manner, and it handles the updating of the inputs and outputs once per scan. At the end of each scan, the controller gives an indication tp the NOE 100 that the controller is at the end of a scan, and the NOE 100 then takes a snapshot of all of the available outputs and copies the outputs into its local memory. The NOE 100 then generates messages to update all of the output devices that are in the I/O scan table. The NOE 100 also takes the current values for all of the input devices (after sending read messages for all of the input devices) and the NOE 100 updates the controller 50 with all of the new input data.

In FIG. 2, there is an indication of a "semaphore controlled" I/O scan table 120. This term was briefly mentioned above. The scan table 120 needs to be available to both the I/O scanner 110 and the server 190 because the server 190 needs to be able to talk to a "peer" device that is generating messages. Those messages will go to the server 190 first (before the I/O scanner 110). Generally, the server 190 receives requests on the Modbus port 502 from other controllers 50, 52 and NOEs 100. Continuing, in order to prevent both the server 190 and the I/O scanner 110 from accessing the I/O scan table 120 at the same time, a control mechanism is provided to control "ownership" of the table at any one time by either the I/O scanner 110 or the server 190. If this is not done, problems with consistency of the data and its use may arise.

The client task 160 is a portion of the NOE 100 that handles "client" tasks. A described above, users of the controllers will create programs to run on the controllers. The programs can be written to send Modbus messages over TCP. The controller 50, 52 will send a message to the backplane 70 (type of message will be handles by the client task 160) and the client task 160 will send the message onto the TCP/IP over Ethernet network. A message will then come back from the TCP/IP over Ethernet network, the client task will handle the return message, and send it onto the controller 50, 52 for use by the program running on the controller 50, 52. The Client Connection Function Library 128 is a library of functions which are used to format and unformat messages to/from the format on the backplane 70 handled by the backplane driver 180, as well as the format of the TCP/IP stack 142, including the handling of the Modbus format.

A detailed flow diagram (chart) of one embodiment of the I/O scanner 110 of the present invention is shown in FIGS. 5A through 5G, as one of ordinary skill would understand. This embodiment does not need to use an RTOS 150 for its operation, and thus includes some additional routines for handling. The program of this detailed flow diagram can be loaded into flash program firmware memory on the NOE.

While the specific embodiments have been illustrated and described, numerous modifications come to mind without significantly departing from the spirit of the invention and the scope of protection is only limited by the scope of the accompanying claims.

We claim:

1. An apparatus for communication with at least one device which resides on a standard communications network using a standard communications protocol, comprising:
    a scanner for scanning the device;
    a device scan table for storing data relating to the device, the scanner using the data in the device scan table relating to the device to scan the device;
    a standard communications interface for interfacing between the scanner and the device on the standard communications network using the standard communication protocol;

wherein the device scan table comprises:
    a first scan parameter indicating the number of devices to be scanned by the device scanner;
    a second scan parameter indicating a device type;
    a third scan parameter indicating where to store and retrieve data for the devices; and,
    a fourth scan parameter indicating the length of the stored data and the retrieved data.

2. An apparatus for monitoring and controlling input and output devices which reside on a standard communications network using a standard communications protocol, comprising:
    a scanner for scanning the input and output devices;
    an input/output (I/O) scan table for storing input and output data relating to the input and output devices;
    a standard communications interface for interfacing between the I/O scanner and the standard communications network using the standard communication protocol;
    wherein the I/O scan table comprises:
        a first scan parameter indicating the number of devices to be scanned by the I/O scanner;
        a second scan parameter indicating whether each device is an input device, an output device, or an input and output device;
        a third scan parameter indicating where to store data from the input devices;
        a fourth scan parameter indicating where to retrieve data for the output devices; and,
        a fifth scan parameter indicating the length of the stored data and the retrieved data, for the input and output devices, respectively.

3. A control system for monitoring input devices and for controlling output devices which reside on a standard communications network using a standard communication protocol, the control system comprising:
    a programmable logic controller (PLC) having a microprocessor and a PLC memory having a configuration table, the PLC being adapted to communicate with at least one or more local input and output devices, and being adapted to communicate with at least one or more remote input and output devices, the configuration table storing parameters for the input and output devices, the parameters including one or more of the following parameters: a first configuration parameter indicating the number of devices to be scanned, a second configuration parameter indicating whether each device is an input device, an output device, or an input and output device, a third configuration parameter indicating where in the PLC memory to store data from the input devices, a fourth configuration parameter indicating where in the PLC memory to retrieve data for the output devices, and a fifth configuration parameter indicating the length of the stored data and the retrieved data, for the input and output devices, respectively;
    a server module adapted for communication with the PLC, adapted for communication with local input and output devices, and adapted for communication with the standard communication network and the remote input and output devices, the server module having: a scanner for scanning the input and output devices, an I/O scan table for storing real time information for the input and output devices, a standard communication protocol interface and a standard communication network driver for interfacing between the I/O scanner and the standard communication network using the standard communication protocol, a real time operating system for operating the server module, wherein the I/O scan table comprises:

a first scan parameter indicating the number of devices to be scanned by the I/O scanner;

a second scan parameter indicating whether each device is an input device, an output device, or an input and output device;

a third scan parameter indicating where in the PLC memory to store data from the input devices;

a fourth scan parameter indicating where in the PLC memory to retrieve data for the output devices; and, a fifth scan parameter indicating the length of the stored data and the retrieved data, for the input and output devices, respectively.

* * * * *